United States Patent [19]

Lamb et al.

[11] Patent Number: 5,578,794
[45] Date of Patent: Nov. 26, 1996

[54] COVER ASSEMBLY FOR RESTRAINING AN OBJECT IN AN ENCLOSURE

[75] Inventors: Dennis Lamb, Stanwood; Monte R. Washburn, Bothell; Mark Lockman, Everett, all of Wash.

[73] Assignee: Fluke Corporation, Everett, Wash.

[21] Appl. No.: 369,203

[22] Filed: Jan. 5, 1995

[51] Int. Cl.$^6$ ................. H05K 5/00; E05C 19/10
[52] U.S. Cl. ............ 174/52.1; 292/99; 292/198
[58] Field of Search ................. 292/99, 101, 128, 292/198, 202, 228; 174/52.1

[56] References Cited

U.S. PATENT DOCUMENTS

| | | | |
|---|---|---|---|
| 4,223,787 | 9/1980 | Lowry et al. | 206/387 |
| 4,363,403 | 12/1982 | Raucci, Jr. et al. | 206/387 |
| 5,028,083 | 6/1991 | Mischenko | 292/175 |
| 5,060,990 | 10/1991 | Smith et al. | 292/91 |
| 5,218,188 | 6/1993 | Hanson | 235/375 |
| 5,255,154 | 10/1993 | Hosoi et al. | 361/680 |
| 5,367,575 | 11/1994 | Dieken et al. | 381/67 |

*Primary Examiner*—Bot L. Ledynh
*Attorney, Agent, or Firm*—Seed and Berry LLP

[57] ABSTRACT

A cover assembly for restraining an object in an enclosure has a cover frame defining an opening at an open end of the enclosure, a cover to cover the opening, a restraining mechanism securing the cover to the cover frame to restrict movement of the cover relative to the cover frame when the cover is in a closed position and thereby restrain the object in the enclosure, and a latch to secure the cover to the cover frame to also restrict movement of the cover relative to the cover frame when the cover is in a closed position. A method for restraining the object in the enclosure includes securing the cover to the cover frame to cover the opening, securing the cover to the cover frame to restrict movement of the cover relative to the cover frame, and unsecuring the cover from the cover frame with a force having a first component force which unsecures the cover from the cover frame and a second component force which moves the cover relative to the cover frame.

14 Claims, 5 Drawing Sheets

Fig. 6c

COVER ASSEMBLY FOR RESTRAINING AN OBJECT IN AN ENCLOSURE

TECHNICAL FIELD

This invention relates to a cover assembly, and more particularly, to a cover assembly for restraining a battery in the battery compartment of an electronic instrument.

BACKGROUND OF THE INVENTION

Portable electronic instruments, such as electronic test equipment, often use a battery as a source for electrical power. The battery is generally heavy and is usually stored in a battery compartment. Since the battery is heavy, it may sometimes come out of the battery compartment if it is not restrained when the electronic instrument is subject to a shock caused, for example, by dropping the instrument. The battery is normally restrained by a cover that is mounted in a cover frame which is part of the electronic instrument and which defines an opening in the battery compartment.

Figure 1:
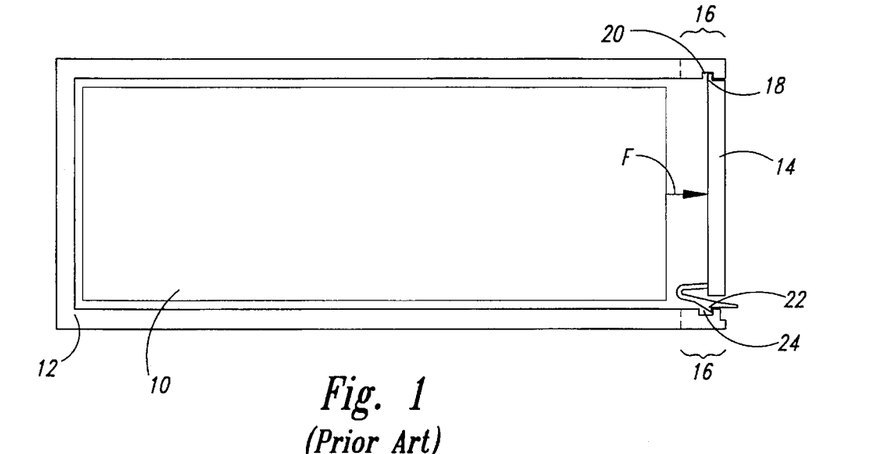
FIG. 1 is a schematic drawing of a conventional cover assembly restraining a battery in a battery compartment.

A conventional cover assembly including a cover and a cover frame is shown in FIG. 1 restraining a battery 10 in a battery compartment 12. The cover assembly includes a cover 14 and a cover frame 16. The cover 14 has a tongue 18 at one edge that fits into a groove 20 formed in the cover frame 16. A latch 22 mounted on the edge opposite the tongue 18 engages to a catch 24 which is also formed in the cover frame 16. Because the battery 10 is heavy, it exerts a force F on the cover 14. The latch 22 and the tongue 18 directly bear the force F from the battery 10 to restrain the battery 10 in the battery compartment 12.

This force F that is exerted directly on the cover 14 may cause problems for the conventional cover assembly. Because the latch 22 directly bears the force F from the battery 10 on the cover 14, large forces F exerted of the battery 10 toward the cover 14 may disengage the latch 22 from the catch 24, allowing the cover 14 to open and the battery 10 to fall out of the battery compartment 12. The stress on the latch 22 from bearing the force F from the battery 10 may also tend to wear the latch 22 out prematurely. Also, because the latch 22 is a prominent feature on the cover 14, the latch 22 may sometimes disengage from the catch 24 if it is struck. This can also happen if an electronic instrument using the conventional cover assembly is dropped on the ground. Further, in order to best restrain the battery 10 in the battery compartment 12, it must be held snugly by pressing the battery 10 into the battery compartment 12. Because the latch 22 bears the force F from the battery 10 on the cover 14, the battery 10 must be pressed into the battery compartment 12 at the same time the latch 22 is engaging to the catch 24. This makes it unnecessarily difficult for the latch 22 to engage to the catch 24. Finally, opening the cover 14 takes three threes or motions. A first force exerted inwardly on the cover is required to unload the cover, a second motion is required to disengage the latch 22 from the catch 24, and a third motion is required to open the cover 14.

Therefore, there is a need in the art for a cover assembly of simple construction which overcomes these problems.

One object of the invention is to provide a cover assembly which consistently restrains an object, such as a battery, in an enclosure, such as a battery compartment.

Another object is to provide a cover assembly which does not wear out from a force on the cover assembly from the object.

A further object is to provide a cover assembly for an electronic instrument which does not fail if the electronic instrument is inadvertently dropped.

Still another object is to provide a cover assembly which is easy to use.

Additional objects, advantages, and novel features of the invention will be set forth in part in the description which follows, and in part will become apparent to those skilled in the art upon examination of the following or may be learned by practice of the invention. The objects and advantages of the invention may be realized mad obtained by means of the instrumentalities and combinations particularly pointed out in the appended claims.

SUMMARY OF THE INVENTION

The present invention provides a cover assembly for restraining an object in an enclosure having open and closed ends, an insertion axis which is substantially orthogonal to these ends, and a cover axis which is substantially orthogonal to the insertion axis. The cover assembly comprises a cover frame located at the open end which defines an opening in the enclosure to receive the object along the insertion axis, a cover to cover the opening, a restraining mechanism to secure the cover to the cover frame to restrain the object in the enclosure, and a latch for releasably engaging the cover to the cover frame. The restraining mechanism restrains the object by restricting movement of the cover relative to the cover frame along the insertion axis, while the latch restricts movement of the cover relative to the cover frame along the cover axis. Preferably, the latch is constructed so that a force acting on it to disengage the cover from the cover frame has first and second component forces. The first component three disengages the cover from the cover frame, and the second component three moves the cover relative to the cover frame along the cover axis. The latch is also fixed to the cover and partially recessed in a cover aperture. Further, the latch is constructed so that a three from the object acting on the cover will cause the latch to further engage the cover to the cover frame. Also preferably, the cover has a plurality of tapered ribs for progressively acting on the object as the cover moves toward the cover frame along the cover axis to move the object toward the closed end in the enclosure along the insertion axis.

The invention also provides a method for releasably restraining the object in the enclosure. The method comprises securing a cover to the cover frame to cover the opening and restrict movement of the cover relative to the cover frame along the insertion axis and thereby restrain the object in the enclosure, securing the cover to the cover frame to restrict movement of the cover relative to the cover frame along the cover axis, and unsecuring the cover from the cover frame with a force having a first component force which unsecures the cover from the cover frame and a second component three which moves the cover relative to the cover frame along the cover axis.

The apparatus and method of the invention thus provide a cover assembly which is easy to use because the latch can be disengaged and the cover separated from the cover frame with one force. The apparatus and method also reliably restrain the object in the enclosure because a force from the object acting on the cover only causes the latch to further engage the cover to the cover frame. Finally, the invention provides a cover assembly for an electronic instrument which does not fail if the electronic instrument is inadvertently dropped because the recessed latch will not strike the ground.

BRIEF DESCRIPTION OF THE DRAWINGS

These and other features of the present invention will be better understood with reference to the following description, appended claims, and accompanying drawings where:

DETAILED DESCRIPTION OF THE INVENTION

Figures 2A, 2B:
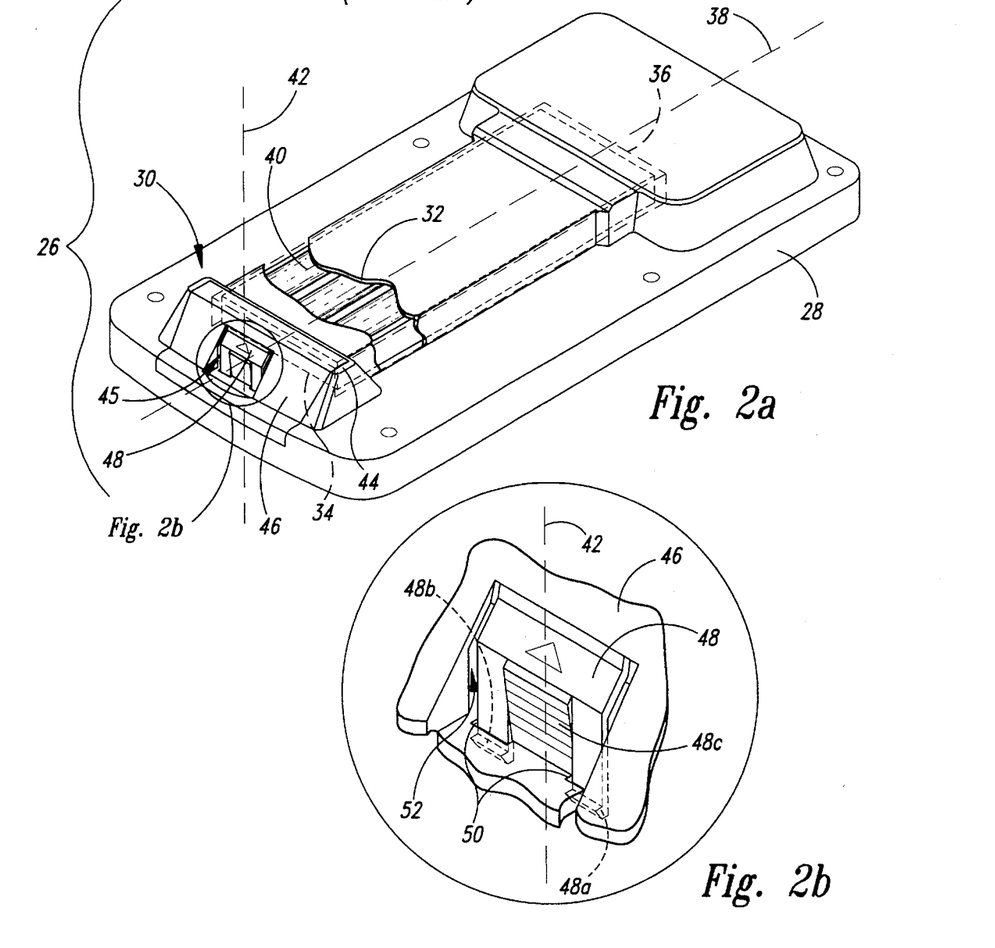
FIGS. 2a and 2b are isometric views of a preferred embodiment of an electronic instrument according to the invention.

With reference to FIGS. 2a and 2b, the inventive cover assembly is preferably embodied in an electronic instrument 26 having a housing 28 and a cover assembly 30. The housing 28 has a battery compartment 32 with open and closed ends 34 and 36, respectively, an insertion axis 38 which extends in the direction that a battery 40 is inserted into the battery compartment 32 and which is substantially orthogonal to the open and closed ends 34 and 36, and a cover axis 42 which is substantially orthogonal to the insertion axis 38. The cover assembly 30 includes a cover frame 44 located at the open end 34 of the battery compartment 32 which defines an opening in the battery compartment 32. The battery 40 is inserted through the opening into the battery compartment 32 along the insertion axis 38. The cover assembly 30 also includes a cover 46 that is releasably secured to the cover frame 44 to cover the opening in the battery compartment 32.

The cover 46 is shown in FIG. 2b engaged to the cover frame 44 (FIG. 2a) by a latch 48 engaged to a catch 50 to restrict movement of the cover 46 relative to the cover frame 44 (FIG. 2a) along the cover axis 42. The cover 46 is preferably constructed in one piece using Valox®, although many other materials will suffice. The latch 48 is preferably integrally formed with the cover 46 and is recessed in an aperture 52 formed in the cover 46. The latch 48 is operated by applying a force to a pad 48c on the latch 48. Because the latch 48 is resilient, this force causes hook tabs 48a, 48b to disengage from the catch 50. The latch 48 is recessed in the aperture 52 so that dropping the electronic instrument 26 (FIG. 2a) on the ground, or otherwise jarring it against an object, will not tend to strike the pad 48c, and therefore will not tend to disengage the hook tabs 48a, 48b from the catch 50. Thus, the cover assembly 30 (FIG. 2a) is less likely than the conventional cover assembly to open if the electronic instrument 26 (FIG. 2a) is inadvertently dropped. Although the latch 48 has been described engaging the catch 50, any means to releasably secure the cover 46 to the cover frame 44 (FIG. 2a) to restrict movement of the cover 46 relative to the cover frame 44 (FIG. 2a) along the cover axis may be used.

Figure 3A:
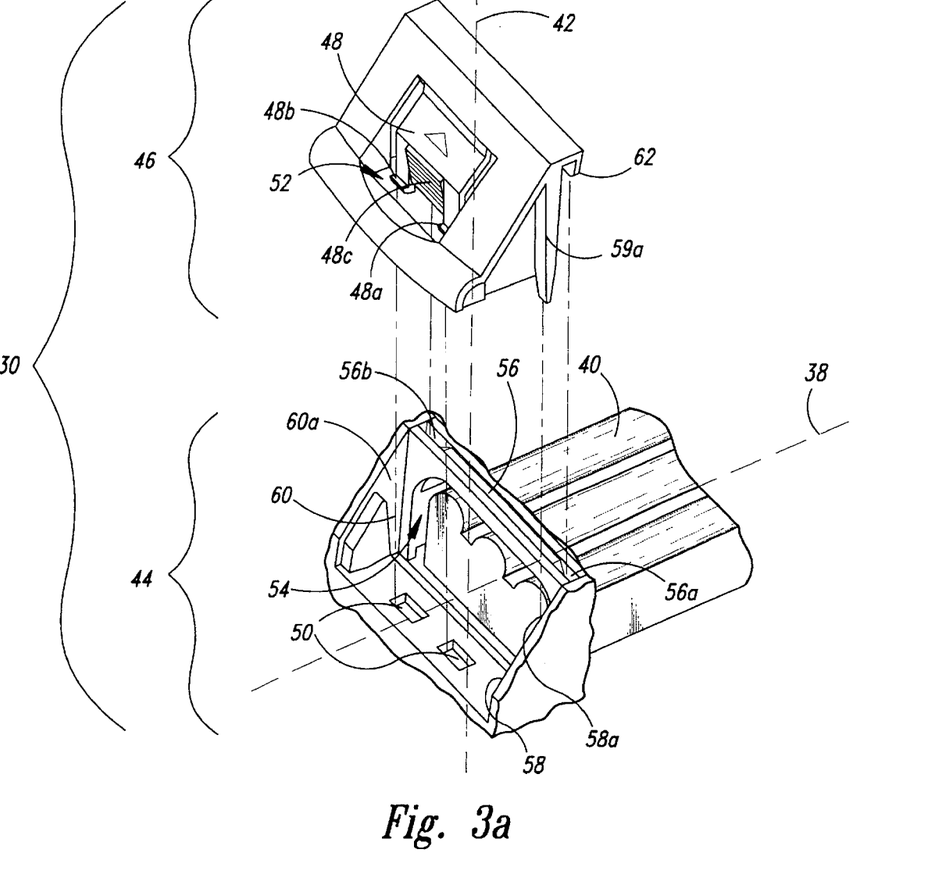
FIGS. 3a and 3b are isometric views of a preferred embodiment of a cover assembly of the electronic instrument of FIGS. 2a and 2b.
Figure 3B:
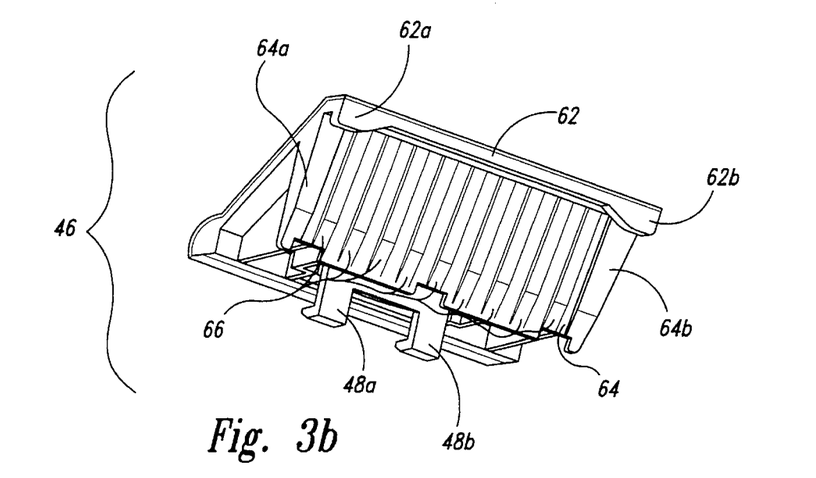

The cover assembly 30 of FIGS. 2a and 2b is shown in FIGS. 3a and 3b with the cover 46 separate from the cover frame 44. The opening 54 defined by the cover frame 44 is located in a plane which is substantially orthogonal to the insertion axis 38. A retention groove 56 having first and second notches 56a, 56b is adjacent to the opening 54. A first channel 58 and an opposing second channel 60 are also adjacent to the opening 54. The first channel 58 has a receMng end 58a which opens toward the retention groove 56, and similarly the second channel 60 has a receiving end 60a which opens toward the retention groove 56.

The cover assembly 30 includes a restraining mechanism that restricts movement of the cover 46 relative to the cover frame 44 along the insertion axis 38 and thereby restrains the battery 40 in the battery compartment 32 (FIG. 2a). The restraining mechanism includes a top retention tongue 62 integrally formed with the cover 46 that is received in the retention groove 56 when the cover 46 is in a closed position. First and second tabs 62a, 62b formed at opposite sides of the top retention tongue 62 are inserted in respective first and second notches 56a, 56b when the cover 46 is in a closed position. The restraining mechanism also includes a bottom retention tongue 64 having first and second retention wedges 64a, 64b which are integrally formed with the bottom retention tongue 64 and which are inserted in first and second channels 58 and, 60. respectively, to prevent movement of the cover 46 along the insertion axis 38. A plurality of ribs 66 projecting from the inner surface of the bottom retention tongue 64, progressively push the battery 40 inwardly along the insertion axis 38 as the cover 46 moves along the cover axis 42 toward its closed position. This is described in more detail below.

The cover assembly 30 operates to restrain the battery 40 in the battery compartment 32 (FIG. 2a) as follows. The cover 46 moves toward the cover frame 44 along the cover axis 42. As the cover 46 approaches the cover frame 44, the retention wedges 64a, 64b begin to mate to the first and second channels 58 and 60. The tabs 62a, 62b then begin to mate to the notches 56a, 56b. Finally, the hook tabs 48a, 48b begin to engage the catch 50. When the hook tabs 48a, 48b engage the catch 50, the cover 46 is secured to the cover frame 44. An outward force of the battery 40 along the insertion axis 38 will then be restrained by the interfit between the cover 46 and the cover frame 44. Also, the cover 46 cannot separate from the cover frame 44 because the hook tabs 48a, 48b are engaged to the catch 50.

Although the preferred embodiment as described allows the cover 46 to separate from the cover frame 44 along the cover axis 42 in only one direction, a cover assembly having a cover which separates from the cover frame in more than one direction may also be used. Also, although a specific restraining mechanism has been described for restricting movement of the cover 46 relative to the cover frame 44 along the insertion axis 38, any means performing the same function may also be used.

Figure 4A:
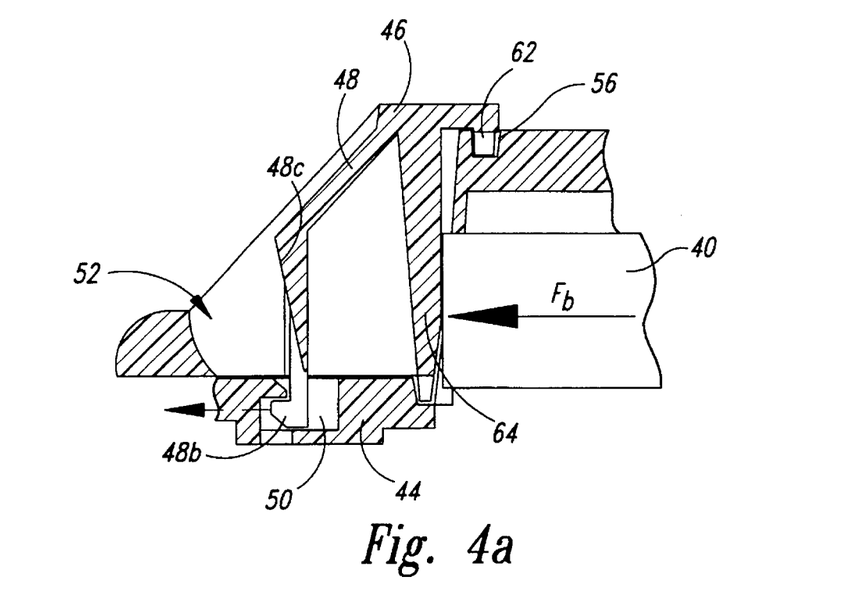
FIGS. 4a and 4b are side cross-sectional views of a preferred latch of the cover assembly of FIGS. 3a and 3b.
Figure 4B:
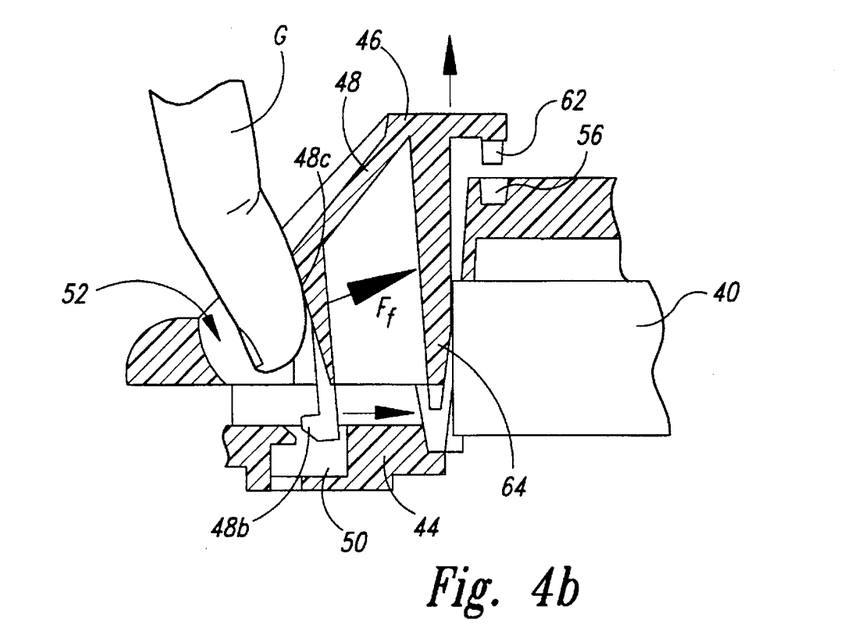

Preferably, the latch 48 is fixed to the cover 46 as shown in FIGS. 4a and 4b. The cover 46 is shown in FIG. 4a with the hook tab 48b engaged to the catch 50 in the cover frame 44 and restraining the battery 40 in the battery compartment 32 (FIG. 2a). The battery 40 exerts a force $F_b$ against the bottom retention tongue 64 fixed to the cover 46. The force $F_b$ imparted to the cover 46 through the bottom retention tongue 64 causes the latch 48 to flex and the hook tab 48b to further engage to the catch 50. Thus, any three from the battery 40 against the cover 46 only causes the cover 46 to further engage to the cover frame 44. In this manner the cover assembly consistently restrains the battery 40 in the battery compartment 32 (FIG. 2a) despite the force $F_b$ from the battery 40 on the cover assembly.

A finger G is shown in FIG. 4b imposing a force $F_f$ on the pad 48c on the latch 48. The latch 48 is fixed to the cover 46 so that the force $F_f$ has two component threes. The first component force flexes the latch 48 to disengage the hook tab 48b from the catch 50. With the hook tab 48b disengaged from the catch 50, the second component force separates the cover 46 from the cover frame 44. This makes the inventive cover assembly easy to use because only one force $F_f$ is needed in order to disengage the cover 46 from the cover frame 44 and to separate the cover 46 from the cover frame 44 so that the battery 40 may be removed.

Figure 5A:
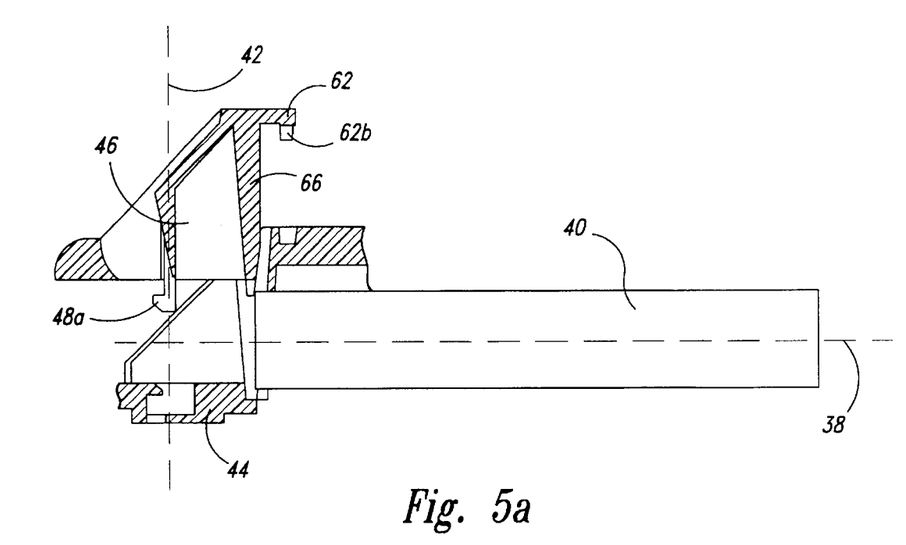
FIGS. 5a and 5b are side elevational views of the cover assembly of FIGS. 3a and 3b showing how closing the cover axially displaces a battery.
Figure 5B:
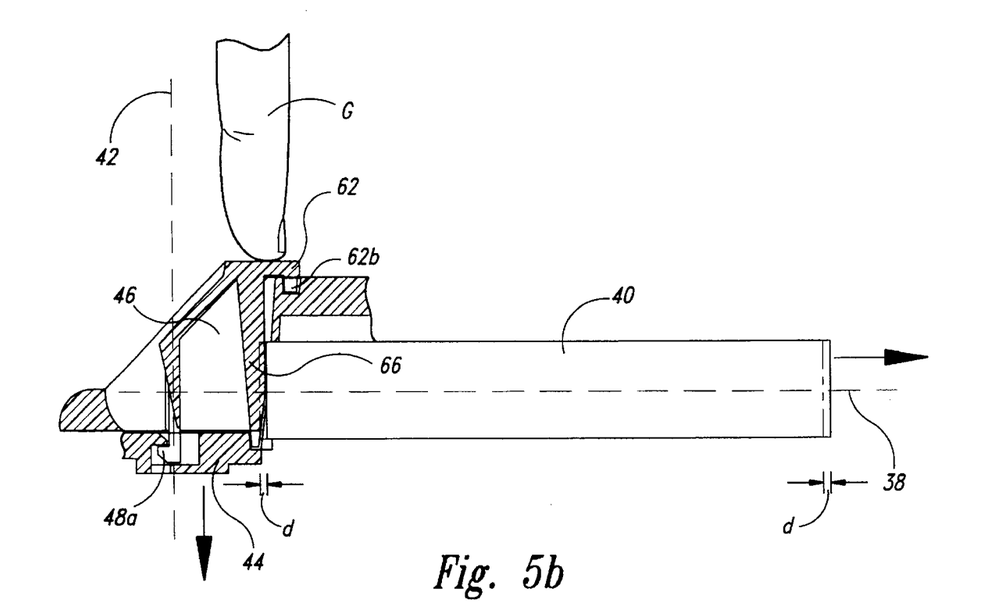

As described above, the ribs 66 progressively push the battery 40 toward the closed end of the battery compartment 32 (FIG. 3b) as the cover 46 moves along the cover axis 42 toward the closed position, as shown in FIGS. 5a and 5b. To accomplish this, the ribs 66 taper inwardly from the bottom of the cover 46. The ribs 66 push the battery 40 inwardly as follows. Referring to FIG. 5a, the cover 46 is shown in relation to the battery 40 just before the cover 46 moves along the cover axis 42 to its closed position. Because the ribs 66 are tapered, movement of the cover 46 relative to the cover frame 44 along the cover axis 42 does not initially move the battery 40 along the insertion axis 38. Referring now to FIG. 5b, a finger G has pressed on the cover 46 and moved it along the cover axis 42 to the fully closed position. As the thicker portions of the ribs 66 met the battery 40, they pushed the battery 40 a distance d toward the closed end of the battery compartment along the insertion axis 38. As a result, the inventive cover assembly is easier to use because the cover 46 does not have to push on the battery 40 at the same time the cover 46 is beginning to engage the cover frame 44. It is only after the cover 46 has partially engaged the cover frame 44 that it begins to push the battery 40 along the insertion axis 38. Although a plurality of ribs 66 have been described progressively acting on the battery 40 as the cover 46 moves along the cover axis 42, any means which performs this function may be used.

Figure 6A:
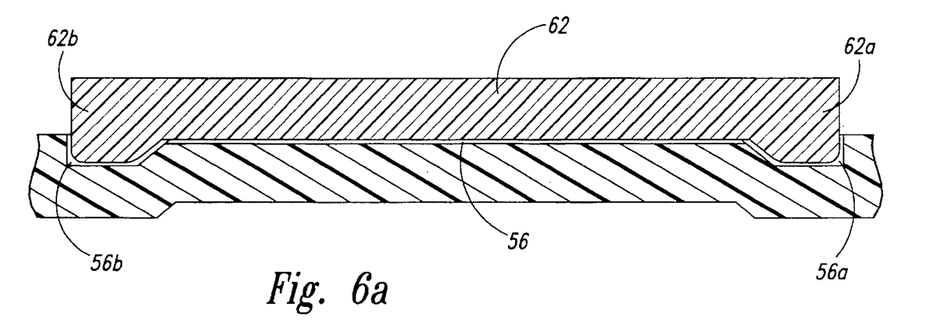
FIGS. 6a, 6b, and 6c are side cross-sectional views of a retention groove and a first and second channel of the cover assembly of FIGS. 3a and 3b.
Figure 6B:
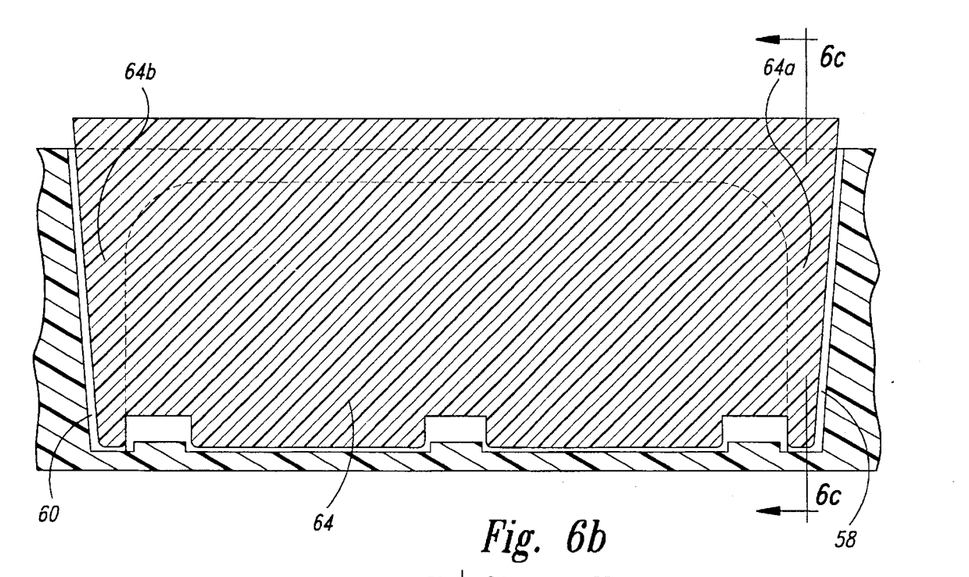
Figure 6C:
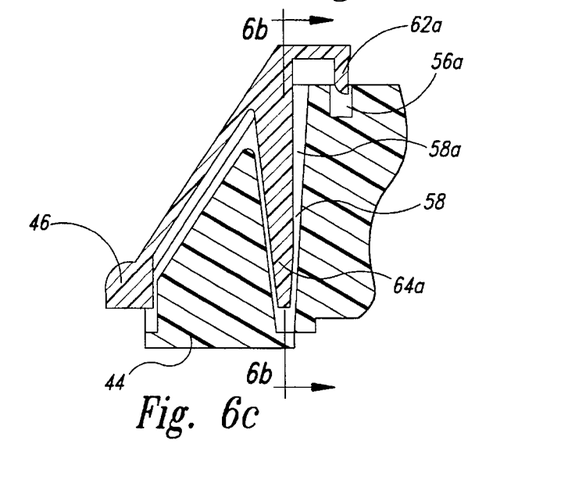

In order to make the cover assembly easier to use, the tabs 62a, 62b, the notches 56a, 56b, the retention wedges 64a, 64b, and the channels 58 and 60, are preferably all tapered, as shown in FIGS. 6a, 6b, and 6c. Referring to FIG. 6a, the notches 56a, 56b are tapered to match the tapered tabs 62a, 62b which mate to the notches 56a, 56b. Thus, as the cover 46 moves toward the cover frame 44 and the top retention tongue 62 begins to mate to the top retention groove 56, the tabs 62a, 62b are initially much narrower than the notches 56a, 56b. This allows the cover 46 to more easily engage to the cover frame 44 because the cover 46 and cover frame 44 do not initially have to be exactly lined up as they begin to engage. Referring to FIG. 6b, the channels 58 and 60, are tapered to mate to the tapered retention wedges 64a, 64b. As between the tabs 62a, 62b and the notches 56a, 56b, the retention wedges 64a, 64b are initially much narrower than the channels 58 and 60 as the retention wedges 64a, 64b begin to enter the channels 58 and 60. This again allows the cover 46 to more easily engage the cover 46 frame because the cover 46 does not have to be exactly lined up with the cover frame 44 as the cover 46 moves along the cover axis. Finally, referring to FIG. 6c, the retention wedge 64a and the channel 58 are shown tapered in a second plane so that they can mate. This again allows the cover 46 to more easily engage the cover frame 44.

The previously described invention has many advantages. It consistently restrains an object in an enclosure by providing a latch which does not bear the force of the battery against the cover and which is fixed to the cover so that the force from the battery on the cover tends to further engage the latch to the catch in the cover frame. Since the latch does not bear the force from the battery, it does not tend to wear out prematurely. Also, because the latch is recessed in a cover aperture, it does not tend to disengage from the cover frame if an electronic instrument having the inventive cover assembly is dropped on the ground. The invention is also easy to use because operation of the latch is obvious and requires no tools, the cover may be disengaged and removed from the cover frame in one motion, and the cover need not exactly line up with the cover frame as it begins to engage the cover frame.

Although the present invention has been described with reference to a preferred embodiment, the invention is not limited to the preferred embodiment. Rather, the invention is limited only by the appended claims, which include within their scope all equivalent devices or methods which operate according to the principals of the invention as described.

We claim:

1. A cover assembly for restraining an object in an enclosure, the enclosure having opposing open and closed ends, an insertion axis which is substantially orthogonal to the open and closed ends, and a cover axis which is substantially orthogonal to the insertion axis, the cover assembly comprising:

a cover frame located at the open end which defines an opening in the enclosure to receive the object along the insertion axis;

a cover to cover the opening;

a restraining mechanism securing the cover to the cover frame to restrict movement of the cover relative to the cover three along the insertion axis when the cover is in a closed position and thereby restrain the object in the enclosure; and a latch to secure the cover to the cover frame to restrict movement of the cover relative to the cover frame along the cover axis when the cover is in the closed position, the latch being constructed so that a force acting on the latch has first and second component forces, the first component force disengaging the latch and the second component force moving the cover relative to the cover frame along the cover axis.

2. The cover assembly of claim 1 wherein the restraining mechanism includes interfitting members formed on the cover and the cover frame.

3. A cover assembly for restraining an object in an enclosure, the enclosure having opposing open and closed ends, an insertion axis which is substantially orthogonal to the open and closed ends, and a cover axis which is substantially orthogonal to the insertion axis, the cover assembly comprising:

a cover frame located at the open end which defines an opening in the enclosure to receive the object along the insertion axis;

a cover to cover the opening, the cover having an aperture;

a restraining mechanism securing the cover to the cover frame to restrict movement of the cover relative to the cover frame along the insertion axis when the cover is in a closed position and thereby restrain the object in the enclosure; and a latch to secure the cover to the cover frame to restrict movement of the cover relative to the cover frame along the cover axis when the cover is in the closed position, the latch being fixed to the cover and partially recessed in the cover aperture.

4. The cover assembly of claim 3 wherein the restraining mechanism includes interfitting members formed on the cover and the cover frame.

5. A cover assembly for restraining an object in an enclosure, the enclosure having opposing open and closed ends, an insertion axis which is substantially orthogonal to the open and closed ends, and a cover axis which is substantially orthogonal to the insertion axis, the cover assembly comprising:

a cover frame located at the open end which defines an opening in the enclosure to receive the object along the insertion axis;

a cover to cover the opening;

a restraining mechanism securing the cover to the cover frame to restrict movement of the cover relative to the cover frame along the insertion axis when the cover is in a closed position and thereby restrain the object in the enclosure; and a latch to secure the cover to the cover frame to restrict movement of the cover relative to the cover frame along the cover axis when the cover is in the closed position, the latch being constructed so that a force from the object acting on the cover will cause the latch to further secure the cover to the cover frame.

6. The cover assembly of claim 5 wherein the restraining mechanism includes interfitting members formed on the cover and the cover frame.

7. A cover assembly for restraining an object in an enclosure, the enclosure having opposing open and closed ends, an insertion axis which is substantially orthogonal to the open and closed ends, and a cover axis which is substantially orthogonal to the insertion axis, the cover assembly comprising:

a cover frame located at the open end which defines an opening in the enclosure to receive the object along the insertion axis;

a cover to cover the opening, the cover having a plurality of ribs fixed to the cover and lying in a plane which is substantially orthogonal to the insertion axis when the cover is in a closed position, the ribs tapering away from the cover in a plane which is both substantially orthogonal to the plane of the ribs and substantially parallel to the cover axis when the cover is in a closed position, the ribs for progressively acting on the object as the cover moves toward the cover frame along the cover axis to move the object toward the closed end along the insertion axis;

a restraining mechanism securing the cover to the cover frame to restrict movement of the cover relative to the cover frame along the insertion axis when the cover is in a closed position and thereby restrain the object in the enclosure; and a latch to secure the cover to the cover frame to restrict movement of the cover relative to the cover frame along the cover axis when the cover is in the closed position.

8. The cover assembly of claim 7 wherein the restraining mechanism includes interfitting members formed on the cover and the cover frame.

9. A cover assembly for restraining an object in an enclosure, the enclosure having opposing open and closed ends, an insertion axis which is substantially orthogonal to the open and closed ends, and a cover axis which is substantially orthogonal to the insertion axis, the cover assembly comprising:

a cover frame located at the open end which defines an opening in the enclosure to receive the object along the insertion axis, the opening located in a plane which is substantially orthogonal to the insertion axis;

a cover to cover the opening;

interfitting members securing the cover to the cover frame to restrict movement of the cover relative to the cover frame along the insertion axis when the cover is in a closed position and thereby restrain the object in the enclosure, the interfitting members including:

a retention groove formed on the cover frame adjacent to the opening, the retention groove having first and second notches at opposing first and second ends, respectively, the first and second notches tapering toward the insertion axis in a plane which is substantially parallel to the plane of the opening;

opposing first and second channels formed on the cover frame adjacent to the opening, the first and second channels each having an open side opening toward the insertion axis, the first and second channels each also having a receiving end opening toward the retention groove, the first and second channels tapering away from the retention groove in a plane which is substantially parallel to the plane of the opening, the first and second channels further tapering away from the retention groove in a plane which is substantially orthogonal to the plane of the opening;

a top retention tongue formed on the cover and having a top end and opposing first and second ends, the top end fixed to the cover, the top retention tongue lying in a plane which is substantially parallel to the plane of the opening when the cover is in a closed position, the top retention tongue for mating to the retention groove, the top retention tongue also having opposing first and second tabs fixed at the first and second ends, respectively, the first and second tabs for mating to the first and second retention groove notches, respectively, the first and second tabs tapering away from the top retention tongue in a plane which is substantially parallel to the plane of the top retention tongue;

a bottom retention tongue formed on the cover and having a top end and opposing first and second ends, the top end fixed to the cover, the bottom retention tongue lying in a plane which is substantially parallel to the plane of the top retention tongue, the bottom retention tongue also having opposing first and second retention wedges fixed at the first and second ends, respectively, the first and second retention wedges for mating to the first and second channels, respectively, the first and second retention wedges tapering away from the cover in a plane which is substantially parallel to the plane of the bottom retention tongue, the first and second retention wedges further tapering away from the cover in a plane which is both substantially orthogonal to the plane of the bottom retention tongue and substantially parallel to the cover axis when the cover is in the closed position; and a latch to secure the cover to the cover frame to restrict movement of the cover relative to the cover frame along the cover axis.

10. An electronic instrument comprising:

a housing having a battery compartment for containing a battery, the battery compartment having opposing open and closed ends, an insertion axis which is substantially orthogonal to the open and closed ends, and a cover axis which is substantially orthogonal to the insertion axis;

a cover assembly for restraining the battery in the battery compartment, the cover assembly including:

a cover frame located at the open end which defines an opening in the battery compartment to receive the battery along the insertion axis, the opening located in a plane which is substantially orthogonal to the insertion axis, the cover frame having a catch adjacent to the opening;

a cover to cover the opening, the cover having an aperture, the cover also having a plurality of ribs fixed to the cover and lying in a plane which is substantially orthogonal to the insertion axis when the cover is in a closed position, the ribs tapering away from the cover in a plane which is both substantially orthogonal to the plane of the ribs and substantially parallel to the cover axis when the cover is in a closed position, the ribs for progressively acting on the battery as the cover moves toward the cover frame along the cover axis to move the battery toward the closed end along the insertion axis;

interfitting members securing the cover to the cover frame to restrict movement of the cover relative to the cover frame along the insertion axis when the cover is in a closed position and thereby restrain the battery in the battery compartment, the interfitting members including:

a retention groove formed on the cover frame adjacent to the opening, the retention groove having first and second notches at opposing first and second ends, respectively, the first and second notches tapering toward the insertion axis in a plane which is parallel to the plane of the opening;

opposing first and second channels formed on the cover frame adjacent to the opening, the first and second channels each having an open side opening toward the insertion axis, the first and second channels each also having a receiving end opening toward the retention groove, the first and second channels tapering away from the retention groove in a plane which is substantially parallel to the plane of the opening, the first and second channels further tapering away from the retention groove in a plane which is substantially orthogonal to the plane of the opening;

a top retention tongue formed on the cover and having a top end and opposing first and second ends, the top end fixed to the cover, the top retention tongue lying in a plane which is substantially parallel to the plane of the opening when the cover is in a closed position, the top retention tongue for mating to the retention groove, the top retention tongue also having opposing first and second tabs fixed at the first and second ends, respectively, the first and second tabs for mating to the first and second retention groove notches, respectively, the first and second tabs tapering away from the top retention tongue in a plane which is substantially parallel to the plane of the top retention tongue;

a bottom retention tongue formed on the cover and having a top end and opposing first and second ends, the top end fixed to the cover, the bottom retention tongue lying in a plane which is substantially parallel to the plane of the top retention tongue, the bottom retention tongue also having opposing first and second retention wedges fixed at the first and second ends, respectively, the first and second retention wedges for mating to the first and second channels, respectively, the first and second retention wedges tapering away from the cover in a plane which is substantially parallel to the plane of the bottom retention tongue, the first and second retention wedges further tapering away from the cover in a plane which is both substantially orthogonal to the plane of the bottom retention tongue and substantially parallel to the cover axis when the cover is in a closed position; and a latch to engage to the cover frame catch to restrict movement of the cover relative to the cover frame along the cover axis when the cover is in a closed position, the latch being fixed to the cover and partially recessed in the cover aperture, the latch being constructed so that a force acting on the latch has first and second component forces, the first component force disengaging the latch from the cover frame catch and the second component force moving the cover relative to the cover frame along the cover axis, the latch also being constructed so that a force from the battery acting on the cover will cause the latch to further engage to the cover frame catch.

11. A method for releasably restraining an object in an enclosure, the enclosure having opposing open and closed ends, an insertion axis which is substantially orthogonal to the open and closed ends, a cover axis which is substantially orthogonal to the insertion axis, and a cover frame located at the open end which defines an opening in the enclosure to receive the object along the insertion axis, the method comprising:

securing a cover to the cover frame to cover the opening and restrict movement of the cover relative to the cover frame along the insertion axis and thereby restrain the object in the enclosure;

securing the cover to the cover frame to restrict movement of the cover relative to the cover frame along the cover axis; and unsecuring the cover from the cover frame with a force having first and second component forces, the first component force unsecuring the cover from the cover frame and the second component force moving the cover relative to the cover frame along the cover axis.

12. The method of claim 11 wherein securing the cover to the cover frame to restrict movement along the insertion axis comprises:

providing interfitting members formed on the cover and the cover frame; and mating the interfitting members formed on the cover to the interfitting members formed on the cover frame.

13. The method of claim 11 wherein securing the cover to the cover frame restrict movement along the cover axis comprises:

providing a latch fixed to the cover;

providing a catch formed in the cover frame adjacent to the opening; and engaging the latch to the catch.

14. The method of claim 13 wherein unsecuring the cover from the cover frame comprises imposing the force on the latch to disengage the latch from the catch with the first component force.

\* \* \* \* \*

UNITED STATES PATENT AND TRADEMARK OFFICE
CERTIFICATE OF CORRECTION

PATENT NO.    :    5,578,794
DATED         :    November 26, 1996
INVENTOR(S)   :    Dennis Lamb et al.

It is certified that error appears in the above identified patent and that said Letters Patent is hereby corrected as shown below:

In column 6, claim 1, line 30, please delete "three" and insert therefor --frame--.

In column 10, claim 10, line 13, please delete "a" and insert therefor --the--.

In column 10, claim 13, line 53, following "frame" insert --to--.

Signed and Sealed this

Sixth Day of May, 1997

Attest:

BRUCE LEHMAN

*Attesting Officer*    *Commissioner of Patents and Trademarks*